UNITED STATES PATENT OFFICE.

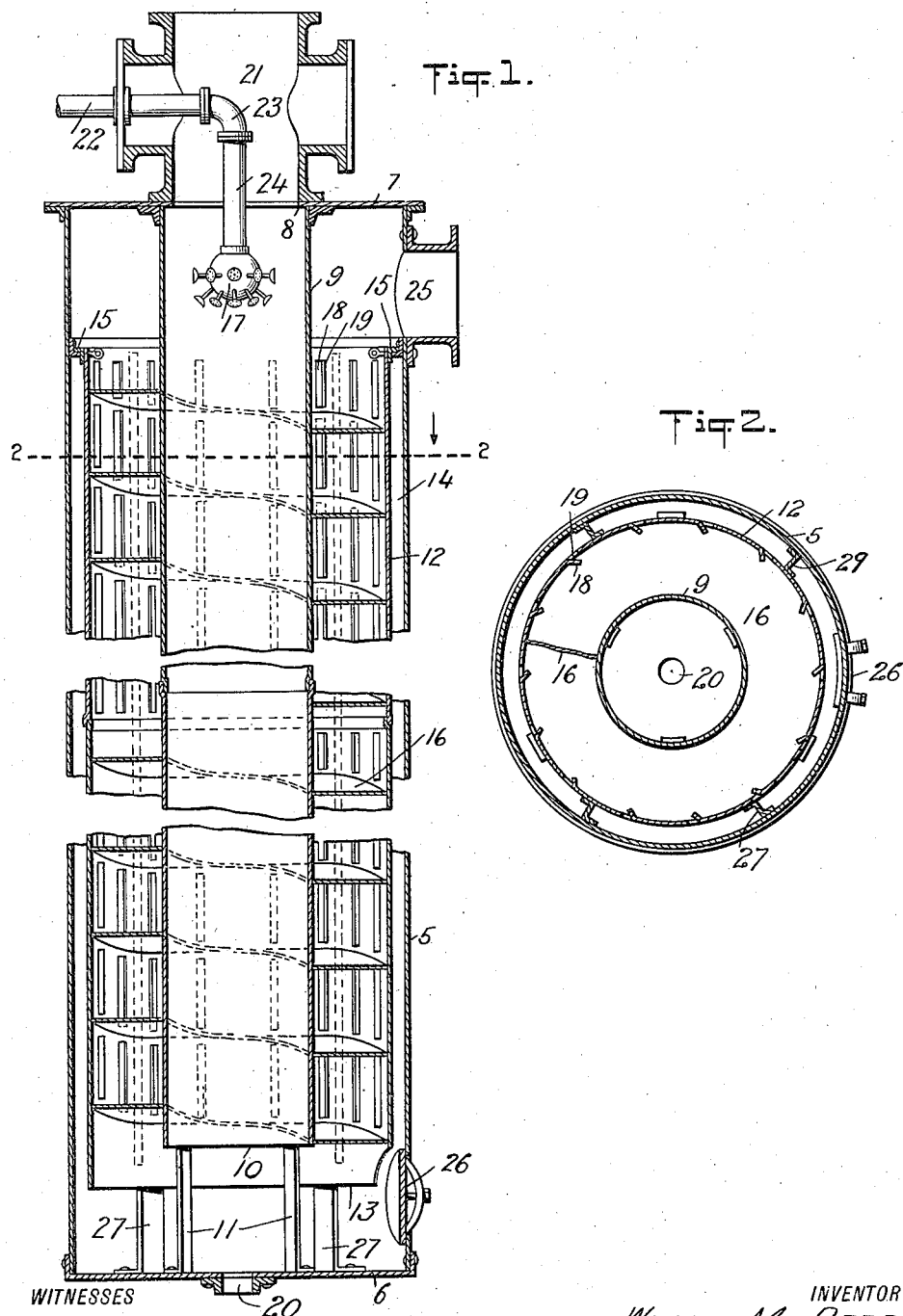

WILLIS M. DERBY, OF BUCHANAN, NEW YORK.

GAS-SCRUBBER.

1,138,460.

Specification of Letters Patent. Patented May 4, 1915.

Application filed September 25, 1913. Serial No. 791,766.

*To all whom it may concern:*

Be it known that I, WILLIS M. DERBY, a citizen of the United States, and a resident of Buchanan, county of Westchester, and State of New York, have invented a new and Improved Gas-Scrubber, of which the following is a full, clear, and exact description.

My invention has for its object to provide a gas scrubber having a spiral member for directing the gas in a circular path so that all the impurities and moisture will be directed outwardly to be deflected by flanges through openings in a wall at the outer side of the spiral.

Another object of the invention is to provide means for directing gas downwardly and spraying it at the inner side of the spiral to cool and remove some of the impurities, the gas then being permitted to pass upwardly through the spiral.

Still another object of the invention is to provide an outer casing spaced from the said wall to form a passage way for the impurities and moisture which may be deflected by the flanges through the openings in the wall.

Still other objects of the invention will appear in the following specification in which the preferred form of the invention is disclosed.

In the drawings similar reference characters refer to similar parts in the two views in which—

Figure 1 is a vertical sectional view of my gas scrubber, and Fig. 2 is a sectional view on the line 2—2 of Fig. 1.

My gas scrubber is devised for operation without any internal moving mechanism and it may therefore be manufactured and operated at comparatively little expense and in fact no power is required in the operation of the scrubber except that which is required to supply the water to the sprays at preferably 30 to 40 pounds pressure, to which of course, must be added the necessary power to force or draw the gas from the producer through the scrubber.

By referring to the drawings it will be seen that a tubular casing 5 is provided which is shown in a vertical position, this tubular casing 5 having a head or bottom 6 and a head or top 7, there being an opening 8 in this head or top 7, through which the gas may pass to the tubular member 9 which is disposed within the tubular casing 5, the tubular member 9 being of considerably less diameter than the tubular casing 5 as will be seen by referring to the drawings. The bottom 10 of the tubular member 9 is spaced from the head or bottom 6 of the tubular casing 5 and this bottom 10 of the tubular member 9 is supported on the legs 11 which rest on the head or bottom 6 of the tubular casing 5. Disposed around the tubular member 9 and within the tubular casing 5 there is a second tubular member 12 which is of slightly less diameter than the tubular casing 5. The bottom 13 of this tubular member 12 extends below the horizontal plane at the bottom 10 of the tubular member 9, but the tubular member 13 does not extend upwardly as far as the horizontal plane at the top of the tubular member 9.

In order to close the space 14 between the tubular member 12 and the tubular casing 5 at the top of the tubular member 12, I provide members 15 which extend across this space and prevent the upward flow of fluid between the tubular member 12 and the tubular casing 5. Between the tubular members 9 and 12 there is a deflector or spiral 16 for giving the gases, flowing upwardly between the tubular members 9 and 12 a circular motion so that the gas which flows down in the tubular member 9 and which has been sprayed by the sprayer 17 to remove impurities, is given a rotary or circular motion by the said deflector or sprial 16 for the purpose of throwing the impurities and moisture outwardly by centrifugal force and against the tubular member 12 so that the said impurities and moisture will be engaged by the flanges 18 to be deflected through the openings 19 in the tubular member 12 to the space 14 between the tubular member 12 and the tubular casing 5. This moisture and the impurities will fall to the head or bottom 6 of the tubular casing 5 from which they will flow with the water from the sprayer 17 to the drain opening 20, in the head or bottom 6.

As has been stated the gas from the producer enters the scrubber through the pipe 21, a water pipe 22 extending horizontally into this pipe and being connected by an elbow 23 with a pipe 24 leading to the sprayer 17. The gas after passing downwardly in the tubular member 9 and upwardly between the tubular members 9 and 12 flows out through a port 25 at the side of the tubular casing 5 above the members 15.

The tubular members 9 and 12 may be constructed in sections and be secured together as desired so that they may be readily handled. In the bottom of the tubular casing 5 adjacent the head or bottom 6 there is a man-hole 26. The bottom of the tubular member 13 is supported by the legs 27 which rest on the head or bottom 6 of the tubular casing 5. The tubular member 12 and the tubular casing 5 are held spaced apart by the members 29.

Claims.

1. In a gas scrubber, two walls spaced apart to form a passage, one of the walls being curved for directing the gas around the other wall, the curved wall having an opening and a flange extending inwardly from the curved wall at the opening for the purpose specified.

2. In a gas scrubber, a tubular member, a tubular member of less diameter than the first tubular member and disposed therewithin, means between the tubular members for directing a gas circularly around the second tubular member, means for directing the gas from within the second tubular member to the space between the two tubular members, a sprayer in the second tubular member, there being openings in the first tubular member through which impurities and water may pass, and flanges at the openings in the first tubular member and extending inwardly for the purpose specified.

3. In a gas scrubber, a vertical tubular casing having a head at its bottom and a head with an opening at its top, a tubular member disposed in the tubular casing and spaced therefrom and from the first head, the tubular member being connected to the second mentioned head adjacent the opening therein, a second tubular member having openings and disposed around the first tubular member and within the tubular casing, the second tubular member being spaced from the first head, a member for connecting the top of the second tubular member with the tubular casing, a deflector between the two tubular members for giving a gas passing therethrough, a circular motion, a sprayer in the first tubular member, an outlet in the casing for the gas above the second tubular member, and flanges extending inwardly from the second tubular member at the openings therein.

4. In a gas scrubber, a spiral member for giving the gas a circular motion, a member at the outer side of the spiral member and having an opening or openings through which impurities may pass and a flange or flanges extending inwardly from the second member at the said opening or openings.

5. In a gas scrubber, means for giving the gas a circular motion, two members spaced apart around the said means, the inner of the said two members having an opening or openings through which impurities may pass and a flange or flanges extending obliquely and inwardly from the inner of the said two members at the said opening or openings.

6. In a gas scrubber, a tubular member, a tubular member of less diameter than the first tubular member and disposed therewithin, means between the tubular members for directing a gas circularly around the second tubular member, means for directing the gas from within the second tubular member to the space between the tubular members, a sprayer in the second tubular member there being openings in the first tubular member through which impurities and water may pass.

7. In a gas scrubber, a spiral member for giving the gas a circular motion and inwardly disposed flanges at the outer side of the spiral member for collecting the impurities which may be suspended in the gas.

8. In a gas scrubber, a tubular member, a deflector in the tubular member for giving the gas, passing through the tubular member, a circular motion and means extending inwardly at the tubular member for collecting impurities which may be held in suspension in the gas.

9. In a gas scrubber, a tubular casing having a head, a tubular member disposed in the tubular casing and having one of its ends spaced from the said head, a deflector between the tubular member and the tubular casing for giving the gas, passing between the tubular member and the tubular casing, a circular motion, and means extending inwardly at the tubular casing for collecting impurities suspended in the gas.

10. In a gas scrubber, a tubular casing having a head, a tubular member disposed in the tubular casing and having one of its ends spaced from the said head, a deflector between the tubular member and the tubular casing for giving the gas, passing between the tubular member and the tubular casing, a circular motion, flanges extending inwardly at the tubular casing for collecting impurities suspended in the gas and a sprayer in the tubular member.

11. In a gas scrubber, a vertical tubular casing having a head at its bottom and a head with an opening at its top, a tubular member disposed in the tubular casing and spaced therefrom and from the first head, the tubular member being connected to the second mentioned head adjacent the opening therein, a second tubular member having openings and disposed around the first tubular member and within the tubular casing, the second tubular member being spaced from the first head, a member for connecting the top of the second tubular member with the tubular casing, a deflector between the two tubular members for giving a gas passing therethrough, a circular motion, a sprayer in the first tubular member and an outlet in the casing for the gas above the second tubular member.

In testimony whereof I have signed my name to this specification in the presence of two subscribing witnesses.

WILLIS M. DERBY.

Witnesses:
EVERARD B. MARSHALL,
PHILIP D. ROLLHAUS.